(12) United States Patent  (10) Patent No.: US 7,845,544 B2
Machida et al.  (45) Date of Patent: Dec. 7, 2010

(54) FRICTION STIR WELDING METHOD AND FRICTION STIR WELDING TOOL

(75) Inventors: Haruo Machida, Tochigi (JP); Tadashi Goto, Tochigi (JP)

(73) Assignee: Honda Motor., Ltd., Tokyo (JP)

( * ) Notice: Subject to any disclaimer, the term of this patent is extended or adjusted under 35 U.S.C. 154(b) by 264 days.

(21) Appl. No.: 11/557,155

(22) Filed: Nov. 7, 2006

(65) Prior Publication Data

US 2007/0114263 A1     May 24, 2007

(30) Foreign Application Priority Data

Nov. 8, 2005   (JP)   ............................. 2005-323888

(51) Int. Cl.
    *B23K 20/12*    (2006.01)
(52) U.S. Cl. ................... 228/112.1; 228/2.1; 228/2.3
(58) Field of Classification Search .................. 228/2.1, 228/112.1, 2.3
    See application file for complete search history.

(56) References Cited

U.S. PATENT DOCUMENTS 5,794,835 A * 8/1998 Colligan et al. .............. 228/2.1
5,943,782 A * 8/1999 Leini et al. ..................... 30/383
6,199,745 B1 * 3/2001 Campbell et al. ......... 228/112.1
6,516,992 B1 * 2/2003 Colligan ................... 228/112.1
6,772,935 B2 * 8/2004 Scheglmann et al. ..... 228/112.1

FOREIGN PATENT DOCUMENTS

| JP | 7-505090   |   | 6/1995 |
| JP | 11-010367  |   | 1/1999 |
| JP | 11010367   | * | 1/1999 |
| JP | 3530342    |   | 3/2004 |
| JP | 2004-136365|   | 5/2004 |

* cited by examiner

*Primary Examiner*—George Wyszomierski
*Assistant Examiner*—Michael Aboagye
(74) *Attorney, Agent, or Firm*—Rankin, Hill & Clark LLP

(57) ABSTRACT

In a friction stir welding method for friction stirring and welding a material by using a rotating tool having a shoulder and a pin at a front portion of a shaft portion and ejecting a cooling agent from a cooling nozzle to the tool to be cooled thereby, the cooling agent is ejected to a middle portion in an axial direction of the tool to thereby prevent thermal expansion in an axial direction of the tool.

5 Claims, 6 Drawing Sheets

FRICTION STIR WELDING METHOD AND FRICTION STIR WELDING TOOL

The present application claims foreign priority from Japanese Patent Application (P.2005-323888) filed on Nov. 8, 2005, the entire contents of which are hereby incorporated by reference.

BACKGROUND OF THE INVENTION

1. Field of the Invention

The present invention relates to a friction stir welding method and a friction stir welding tool for welding a welded member of a metal plate member, an extruded member or the like by friction stirring the welded member.

2. Related Art

There is known a friction stir welding method for bringing a rotating shaft-like tool into contact with a material, softening a welded portion of the material by friction heat, and welding by stirring (refer to, for example, JP-T-07-505090).

JP-T-07-505090 discloses that by moving a probe (distal end portion) of a rotating tool along a butting line while bringing the probe into contact with butted portions of works butted to each other to carry out friction stir, the butted portions are welded.

In addition, there is known a technology of preventing the material from being adhered to the tool by ejecting a cooling agent to the distal end portion of the tool and the welded portion in the above-described friction stir welding (refer to, for example, JP-B2-3530342).

According to the technology of JP-T-07-505090, in the friction stir welding, there is a case in which the tool is thermally expanded in an axial direction by friction heat, the tool penetrates the welded member. In such a situation, not only an excellent welding state is not achieved in the friction stir welding but also there is a concern that the tool is butted to a back up member for backing up the welded member, a die supporting the welded member or the like to destruct the tool.

According to the technology of JP-B2-3530342, although in order to prevent the material from being adhered to the tool by excessive friction heat to retard a welding speed, in order to deprive excessive heat, the cooling agent is ejected to supply to the distal end portion and the welded face, when the cooling agent is applied to the tool distal end portion, there is a concern that the friction heat is not sufficiently generated at the welded portion, the material is softened insufficiently, and an excellent friction stir welding state is not achieved.

SUMMARY OF THE INVENTION

Embodiments of the invention provide a friction stir welding method capable of carrying out excellent friction stir welding by preventing thermal expansion of a tool in an axial direction by effectively cooling the tool while ensuring friction heat necessary for friction stir welding at a tool distal end potion (pin and shoulder) and a tool preferably used therefor.

In accordance with one or more embodiments of the invention, in a friction stir welding method for friction stirring and welding a material by using a rotating tool having a shoulder and a pin at a front end portion of a shaft portion thereof and ejecting a cooling agent from a cooling nozzle to the tool to be cooled thereby, the cooling agent is ejected to a middle portion in an axial direction of the tool to thereby prevent thermal expansion in the axial direction of the tool.

In the friction stir welding method for ejecting the cooling agent from the cooling nozzle to the tool to be cooled thereby, the cooling agent is ejected to the middle portion in the axial direction of the tool, the thermal expansion in the axial direction of the tool is prevented and therefore, at a butted portion of the material or the like, a temperature drop of the shoulder of the front portion of the shaft portion and the pin of the front end portion related to friction stir welding is small, the middle portion in the axial direction of the tool is cooled while ensuring friction heat necessary and sufficient for friction stir welding. Therefore, elongation caused by the thermal expansion in the axial direction of the tool can be prevented and excellent friction stir welding can be carried out.

Further, the cooling agent may be ejected from the nozzle by a flow velocity of at least 160 m/second.

When the velocity of the cooling agent ejected from the nozzle is constituted by at least 160 m/second, the middle portion in the axial direction of the tool can effectively be cooled and excellent friction stir welding can be carried out.

Further, an axis line of the tool may direct in a vertical direction and an axis line of the ejecting direction of the cooling nozzle may direct in an upper direction and be inclined in the upper direction by 5° through 35° relative to a horizontal face.

When the axis line of the tool is directed in the vertical direction, and the axis line in the ejecting direction of the cooling nozzle is directed in the upper direction, and is inclined in the upper direction by 5° through 35° relative to the horizontal face, the middle portion in the axial direction of the tool can effectively be cooled while preventing an influence of the cooling agent on the shoulder or the pin of the tool and excellent friction stir welding can be carried out.

Further, a sectional shape of an ejection port of the cooling nozzle may be long in an up and down direction and short in a transverse direction.

When the sectional shape of the injection port of the cooling nozzle is constituted to be long in the up and down direction and short in the transverse direction, the cooling agent is supplied along the axis line direction of the tool, the middle portion of the tool can efficiently be cooled, elongation of the tool caused by thermal expansion in the axial direction can be prevented and excellent friction stir welding can be carried out.

Further, in accordance with one or more embodiments of the invention, a friction stir welding tool for friction stir welding used in a friction stir welding method for friction stirring and welding a material by using a rotating tool having a shoulder and a pin at a front portion of a shaft portion thereof and ejecting a cooling agent from a cooling nozzle to the tool to be cooled thereby, is provided with a groove in parallel with an axial direction on an outer peripheral face of the shaft portion.

The groove in parallel with the axial direction is provided at the outer peripheral face of the shaft portion of the tool and therefore, a surface area of an outer periphery of the tool can be increased by the groove in the axial direction of the outer peripheral face, and also with regard to an efficiency of cooling the tool by the cooling agent, the efficiency of cooling the tool by the cooling agent can be increased by increasing the surface area of the outer peripheral face of the tool. Further, the tool per se can be cooled by an operation of enlarging the surface area even by rotating the tool, the efficiency of cooling the tool can further bye increased, elongation of the tool caused by thermal expansion in the axial direction can be prevented and excellent friction stir welding can be carried out.

Other aspects and advantages of the invention will be apparent from the following description and the appended claims.

DETAILED DESCRIPTION OF THE EXEMPLARY EMBODIMENTS

Figure 1:
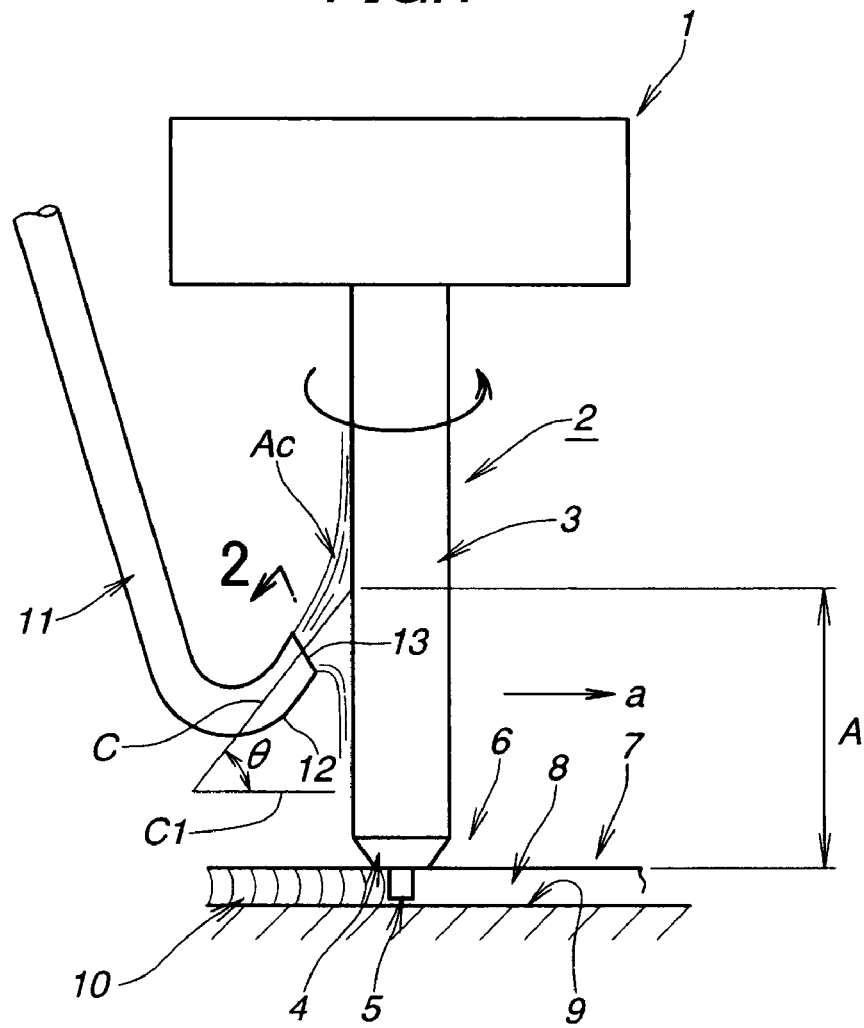
FIG. 1 is an explanatory side view showing a basic concept of friction stir welding according to an embodiment of the invention.
Figure 2:
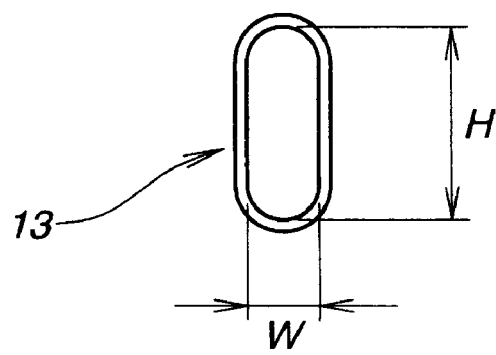
FIG. 2 is a view in an arrow mark 2 direction of FIG. 1 and is a view of an end face of a cooling nozzle.

Exemplary embodiments of the invention are explained as follows in reference to the attached drawings. Further, drawings are viewed in a direction of notation. FIG. 1 is an explanatory side view showing a basic concept of friction stir welding according to the invention, FIG. 2 is a view viewing FIG. 1 in an arrow mark 2 direction, and is a view of an end face of a cooling nozzle. Although according to the embodiment, there is shown an example of directing a front portion of the nozzle in an upper direction, as described later, an axis line of a cooling agent ejection port of the nozzle may be arranged to be orthogonal to an axis line of a tool and a cooling agent may be ejected to a middle portion of the tool.

A tool 2 is supported by a rotating tool holding piece 1 to be hung down therefrom. The tool 2 includes a shaft portion 3 having a length in an axial direction, includes a shoulder 4 in a shape of an inverse frustum of a cone at a front portion 6 of the shaft portion 3, and includes a pin 5 having a small diameter at a front end portion of the shaft portion 3. Numeral 7 designates a welded member arranged on a backing plate 9, and a butt-welded portion 8 of the welded member 7 is subjected to friction stir welding by rotating the tool 2 and moving the tool 2 in an arrow mark a direction relatively.

In friction stir welding, the pin 5 of the tool 2 is brought into contact with the welded portion 8 to face, friction heat is generated by rotating the pin 5, and the butt-welded portion 8 of the welded member 7 is welded by friction heat. By moving the tool in the arrow mark a direction, a welded portion 10 is formed on a rear side in a direction of moving the welded portion 8. The butt-welded portion of the welded member 7 is welded by friction stir as described above.

A nozzle 11 is arranged to eject a cooling agent to a rear side in the direction of moving the tool 2 and blown to a middle portion in an axial direction of the tool 2 in the above-described. In synchronism with movement of the tool 2, the nozzle 11 is moved in the same direction (arrow mark a direction) integrally therewith, ejecting to blow a cooling agent, for example, cooling air to an outer peripheral face on a rear side in a moving direction of the tool 2.

According to the nozzle 11, a middle portion through an upper portion thereof are extended in a skewed upper direction to be remote from the tool 2, a front portion 12 thereof is proximate to a rear face of the tool 2, directed in an upper direction in a bent V-like shape, and an axis line C of an injection-ejection port 13 is directed in an upper direction.

Specifically, the ejection port 13 of the nozzle 11 is proximate to face a middle portion in an axial direction (middle direction in height direction) of the rear side in the moving direction of the shaft portion 3 of the tool 2, the ejection port 13 is opened to direct in an upper direction at a middle portion in an axial direction of the shaft portion 3 and is opposed to an outer peripheral face of a rear portion of a middle portion in an axial direction of the shaft portion 3.

In the above-described, cooling air Ac is ejected to blow from the ejection port 13 of the nozzle 11 to the middle portion in the axial direction of the outer peripheral face of the rear portion of the shaft portion 3 of the tool 2 to direct in an upper direction in friction stir welding. A portion to which cooling air Ac is blown is disposed at a position of a portion which is sufficiently remote from the welded portion 10 which the pin 5, the shoulder 4 generating friction heat face and at which the cooling air Ac is not blown to the welded portion 10.

By the above-described, the cooling air Ac is blown to the middle portion in the axial direction of the shaft portion 3 of the tool 2 to cool the shaft portion and restrains and prevents thermal expansion in the axial direction of the tool 2. At this occasion, the cooling air Ac flows to direct in the upper direction at the middle portion in the axial direction of the shaft portion 3 of the tool 2 and therefore, an influence of an operation of the cooling air Ac for cooling a portion subjected to friction stir welding can be prevented as less as possible. Therefore, in friction stir welding, smooth and excellent friction stir welding can be carried out by preventing friction heat from being deprived as less as possible while cooling the tool.

In the above-described, according to the position of blowing the cooling air Ac to the tool 2, the position is preferably disposed 20 through 40 mm from the front portion of the pin 5, actually, a distance A in a length A1 of the tool 2 from a surface of the welded portion 8 of the welded member 7 to the cooling air Ac is preferably 20 through 40 mm, when the cooling air Ac is blown to the portion in the upper direction, a portion of the tool to which the cooling air Ac is blown constitutes an upper side of the tool, and thermal expansion in the axial direction of the tool can be restrained. When the portion to which the cooling air Ac is blown is disposed excessively on an upper side of the tool, thermal expansion of the tool in friction stir welding cannot be restrained and therefore, the above-described range is preferable.

Next, with regard to an angle of inclination of the ejection port 13 of the nozzle 11 directed in the upper direction, it is preferable that the axis line of the shaft portion 3 of the tool 2 is directed in a vertical direction, and each θ made by the axis line C of the ejection port 13 and a horizontal plane C1 orthogonal to the axis line of the tool 2 falls in a range of 5° through 35° at the above-described distance A of 20 through 40 mm. θ is particularly preferably 20°.

When θ is equal to or larger than 5°, a possibility that cooling air is blown to the heated welded portion is low, and an influence on a distal end portion (a heated portion of the pin, the shoulder or the like as well as a welded portion subjected to friction stir) of the tool by the cooling air can be prevented. When θ exceeds 35°, an amount of flow of the cooling air blowing to an upper side in the axial direction of the tool is increased and a cooling effect is reduced. Therefore, the above-described angle is preferable. Further, when θ is less than 5°, there is also a possibility that the flow of the cooling air blown to the tool 2 is directed to a lower side, in this case, there is a concern that the cooling air flows to the distal end portion of the tool, there is a possibility of depriving friction heat and therefore, the angle is preferably equal to or larger than 5°.

Next, with regard to a size of the ejection port 13 of the nozzle 11, it is preferable that the size is smaller than a diameter of a section of the tool 2. For example, according to the embodiment, whereas an outer diameter of the shaft portion 3 of the tool 2 is 12 mm, an inner diameter of the ejection port 13 is set to long diameter 7 mm×short diameter 1.5 mm. Since the diameter of the election port 13 is smaller than the outer diameter of the tool, the cooling air is firmly blown to the tool 2 and the tool can efficiently be cooled.

Further, with regard to the ejection port 13, as shown by FIG. 2, a vertically long shape is preferable. That is, an elliptical shape constituting a long diameter by the axial direction of the tool 2 and constituting a short diameter by the width direction of the tool is preferable. A vertically long rectangular shape having rounded four corners is also preferable. A ratio of a longitudinal length (H) to a transverse length (W) of an inner diameter portion of the ejection port 13 is set to, for example, 7:1.5.

Next, with regard to a flow rate of the cooling agent, the following is preferable. For example, when cooling air of, for example, $100×10^{-3}$ through $130×10^{-3}$ m3 (100 liters through 130 liters) per minute is blown to the tool 2 having an outer diameter of 12 mm by using the ejection port 13 having H of 7 mm and W of 1.5 mm, thermal expansion of the tool can be confined to an allowable range.

Next, a flow velocity V of the ejection port 13 will be calculated. The flow velocity V can be calculated by (flow rate Q/sectional area ). The flow rate Q is ($100×10^{-3}$ through $130×10^{-3}$)/60 (m3/second) and the sectional area S is ($7×10^{-3}×1.5×10^{-3}$)=$10.5×10^{-6}$ m2. As a result, by calculating the flow rate V=Q/S=($100×10^{-3}$ through $130×10^{-3}$)/($60×10.5×10^{-6}$)=(100 through 130)/0.63=159 through 206 (m/second), the preferable flow velocity of the cooling agent is 160 through 200 (m/second). That is, the flow velocity of the cooling agent may be at least 160 m/second, the flow rate is preferably as fast as possible, and may exceeds 200 m/second.

Although as described above, an explanation has been given such that according to the embodiment, the cooling agent is constituted by cooling air, the cooling agent may be a liquid of cooling water or the like. In a case of a liquid, a specific weight thereof is significantly larger than that of a gas and a cooling function is high and therefore, the flow velocity can be made to be low. With regard to the preferable flow rate of the cooling agent and the preferable flow velocity of the cooling agent described above, the same goes also in an example of arranging the axis line of the cooling agent ejection port of the nozzle mentioned later orthogonally to the axis line of the tool and ejecting the cooling agent to the middle portion of the tool.

Figure 3:
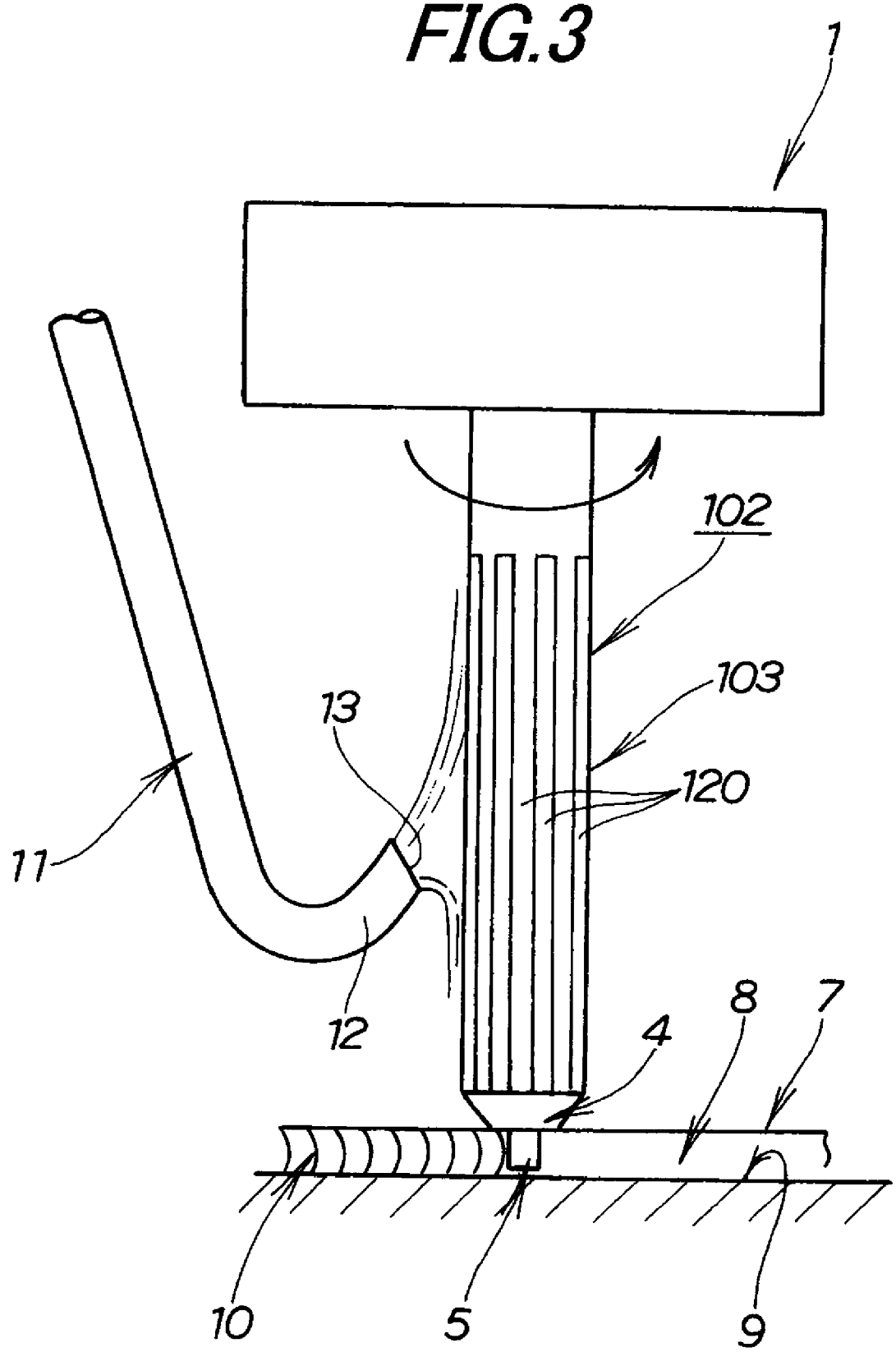
FIG. 3 is a view showing the invention according to a friction stir welding tool and is an explanatory side view similar to FIG. 1.
Figure 4:
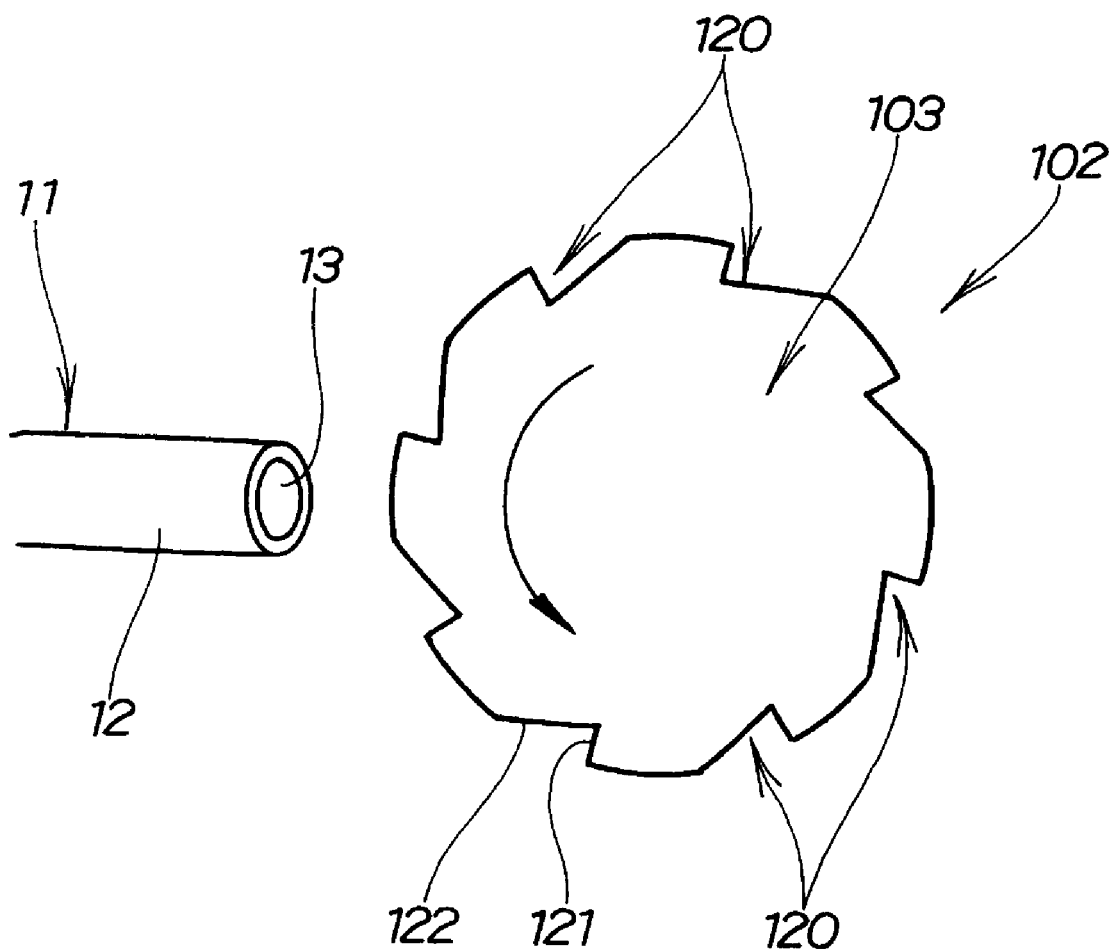
FIG. 4 is a cross-sectional plane view of the tool shown in FIG. 3.

FIG. 3 and FIG. 4 are views showing the invention according to a friction stir welding tool, FIG. 3 is an explanatory side view similar to FIG. 1 and FIG. 4 is an explanatory cross-sectional plane view of the tool. In the drawings, portions the same as the above-described are attached same notations and detailed explanation there of will be omitted. According to the invention, the plurality of pieces of grooves 120 . . . in an axial direction are formed radially at an outer periphery of a shaft portion 103 of a tool 102. The grooves 120 . . . are formed linearly in the axial direction from a middle upper portion of the shaft portion 103 to a front portion thereof or in front of the shoulder 4 in parallel with an axis line.

According to the grooves 120, as shown by FIG. 4, a width 121 in a diameter direction is set to be short, a side 122 in a circumferential direction in a direction following a direction of rotating the tool indicated by an arrow mark is set to be long to thereby set surface areas of the grooves 120 to be large. Thereby, the surface area of the outer periphery of the tool 102 is widened, as a result, the tool per se can be cooled by an operation of enlarging the surface area even by rotating the tool 102. In this case, the direction of rotating the tool is constituted by an arrow mark direction, and the side (wall) 122 in the direction of rotating the tool 102 is exposed to wind blowing at the outer periphery of the tool. Further, as described above, by ejecting to blow the cooling agent of cooling air or the like by the nozzle 11, the cooling operation is further promoted, the above-described cooling operation can further be promoted, and thermal expansion of the tool can be restrained further effectively and further efficiently.

Figure 5:
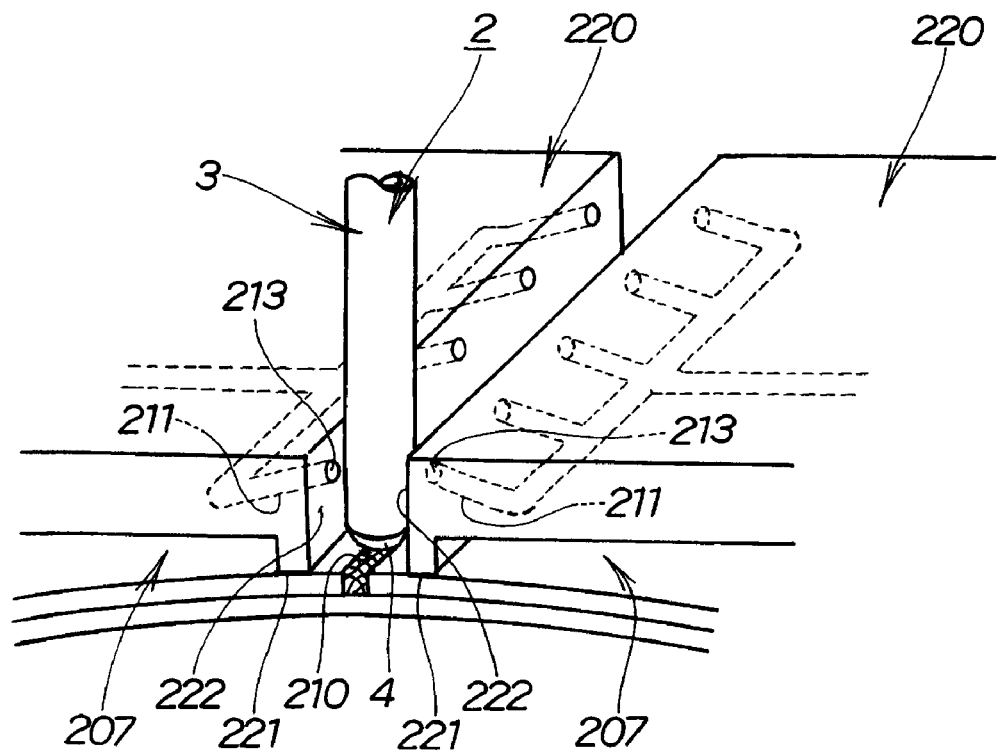
FIG. 5 is a perspective view showing a modified embodiment of the embodiment of FIG. 1.
Figure 6:
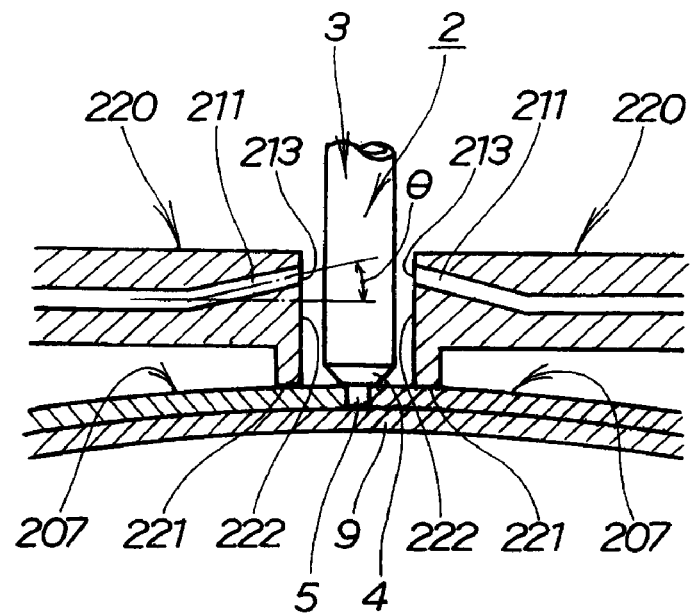
FIG. 6 is a vertical sectional side view of FIG. 5.

FIG. 5 is a perspective view showing a modified embodiment of the embodiment of FIG. 1, FIG. 6 is a vertical sectional side view of FIG. 5. In the drawings, numeral 2 designates the tool, numeral 3 designates the shaft portion, numeral 4 designates the shoulder, numeral 5 designates the pin. Press metals 220, 220 for pressing vicinities of a butt-welded portion (welded portion 210) of welded members 207, 207 arranged on the backing plate 9 press to hold the vicinities of the welded portion by press leg portions 221, 221 arranged opposedly. The welded portion 210 of the welded members 207, 207 faces between end portions of the press metals 220, 220 opposed to each other, the distal end portion of the tool 2 faces between the end portions, and operation of friction stir welding is carried out.

Insides of the above-described press metals 220, 220 are provided with ejection ports 213, 213 of the cooling agent to open to end faces 222, 222 opposed to each other. The ejection ports 213, 213 are communicated with paths 211, 211 constituting nozzles provided at insides of the press metals 220, 220, and eject to blow the cooling agent supplied from a cooling agent supply source to the middle portion of the shaft portion 3.

Meanwhile, as clearly shown in FIG. 6, the paths 211, 211 constituting the nozzles are set to be opposed to each other and to be inclined in upper directions, and the ejection ports 213, 213 are provided to be inclined in upper directions by an angle θ. The angle inclined in the upper direction of a front end of the path of the ejection port is similar to the above-described. In this way, the cooling agent may be ejected to blow to the tool by providing the cooling agent paths at insides of the press metals used in subjecting the butted portions of the welded members to friction stir welding and opening the ejection ports of the cooling agent to the end faces of the metal plates opposed to the tool.

Figure 7:
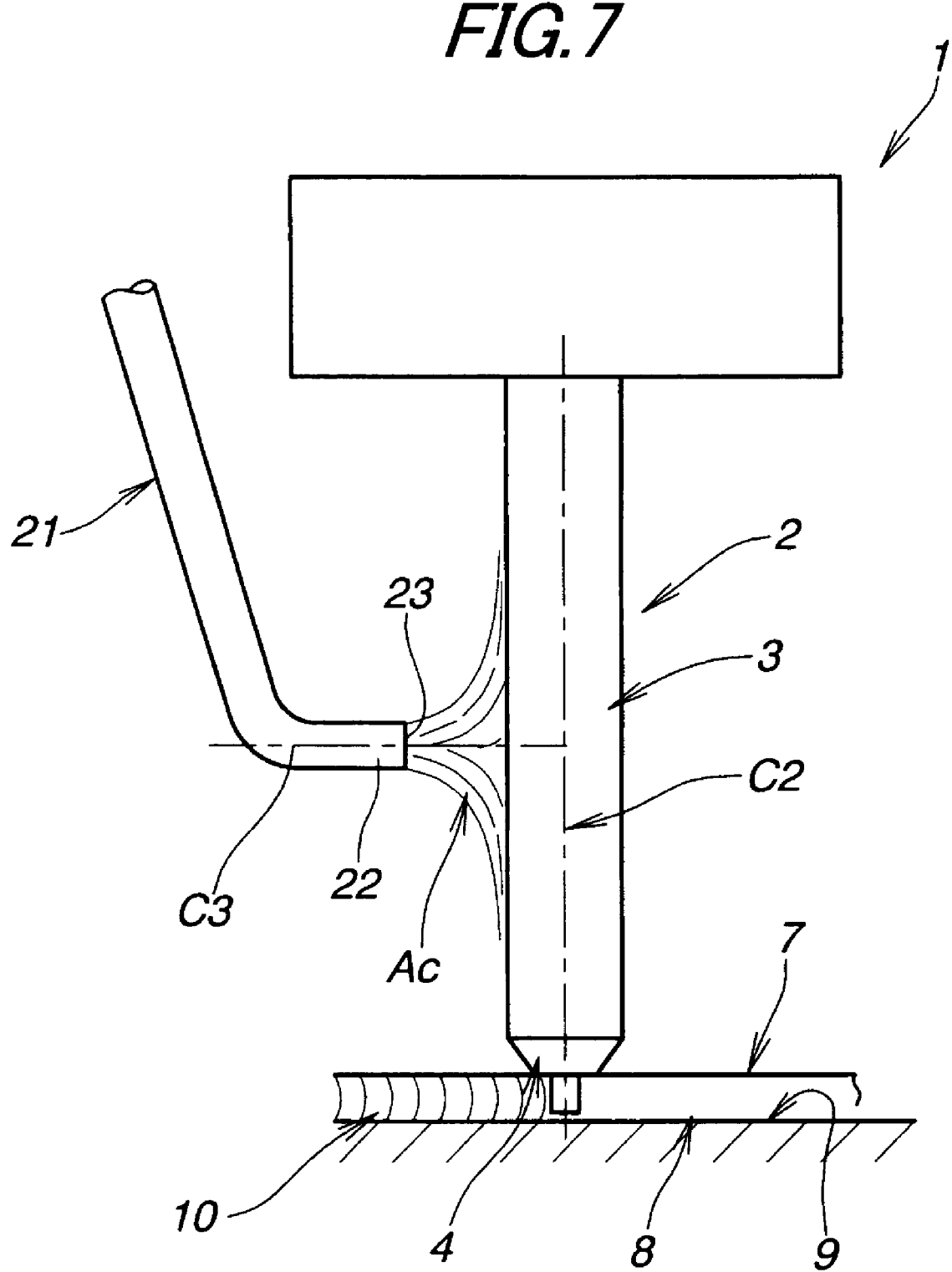
FIG. 7 is an explanatory side view of a modified embodiment of FIG. 1.

FIG. 7 is an explanatory side view showing an embodiment of ejecting the cooling agent to the middle portion of the tool by arranging the axis line of the ejection port of the cooling agent of the nozzle to be orthogonal to the axis line of the tool. A cooling agent ejection port 23 of a nozzle 21 faces the outer periphery of the tool 2 and the periphery of the middle portion of the length in the axial direction by providing a predetermined gap therebetween, a front portion 22 of the nozzle 21 is directed in a horizontal direction, an axis line C3 of the cooling agent ejection port 23 is directed in the direction substantially orthogonal to an axis line C2 directed in the vertical direction of the tool 2, and the axis line C3 of the cooling agent ejection port 23 is substantially horizontal. The cooling agent ejection port 23 is opposed to the middle portion in the length direction of the shaft portion 3 of the tool 2.

The flow rate and the flow velocity of the cooling agent are similar to those of the above-described even in the embodiment of arranging the axis line C3 of the cooling agent ejection port 23 of the nozzle 21 to be orthogonal to the axis line C2 of the tool 2 and ejecting the cooling agent Ac to the middle portion of the shaft portion 3 of the tool 2 as described above, when the same flow rate and the same flow velocity of cooling air is blown thereto, thermal expansion of the tool can be confined in the allowable range.

Figure 8:
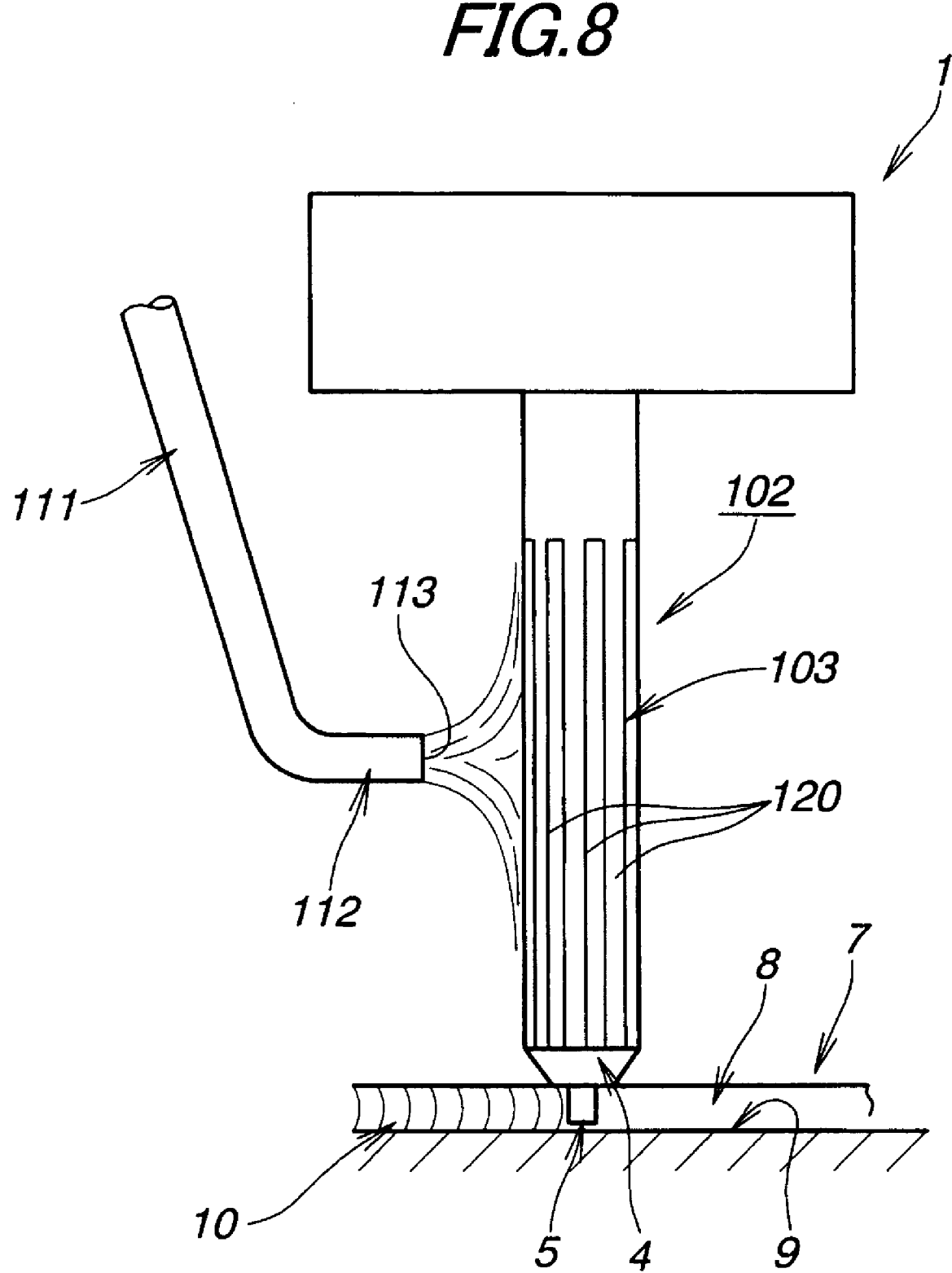
FIG. 8 is an explanatory side view of a modified embodiment of FIG. 3.

FIG. 8 shows a modified embodiment of the embodiment of FIG. 3 mentioned above, the plurality of pieces of the grooves 120 in the axial direction are radially formed at the outer periphery of the shaft portion 103 of the tool 102, a front portion 112 of a nozzle 111 is directed substantially in the horizontal direction, and an axis line of a cooling agent ejection port 113 is directed in a direction substantially orthogonal to an axis line of the tool 102 directed substantially in the vertical direction.

Also in the embodiment, a cooling agent is ejected to supply to the middle portion in the axial direction of the tool 102 provided with the grooves 120 at the outer periphery, the surface area of the outer periphery of the tool 102 is widened similar to the above-described by the grooves 120, even by rotating the tool 102, the tool per se can be cooled by the surface area enlarging operation, the side (wall) 122 in the direction of rotating the tool 102 is exposed to wind blowing at the outer periphery of the tool, by ejecting to blow the cooling agent of cooling air or the like by the nozzle 111, the cooling operation is further promoted, the above-described cooling operation can further be promoted, and the thermal expansion of the tool can be restrained further effectively and further efficiently.

Although an explanation has been given of the invention in details in reference to the specific embodiments, it is apparent for the skilled person that the invention can variously be changed or modified without deviating from the spirit and range of the invention.

What is claimed is:

1. A friction stir welding method for friction stirring and welding a material by using a rotating tool having a shoulder and a pin at a front end portion of a shaft portion thereof and ejecting a cooling agent from a cooling nozzle to the tool to be cooled thereby, the friction stir welding method comprising:

ejecting the cooling agent from the cooling nozzle toward an outer surface of a middle shaft portion, said middle shaft portion being in a middle portion of the shaft in an axial direction of the rotating tool shaft portion, said cooling agent being ejected at a position and in a direction, relative to the rotating tool shaft portion, so as to contact and flow over the outer surface of the tool shaft portion at a location spaced from the shoulder and the pin so as to cool the middle shaft portion of the tool, wherein the nozzle is spaced a distance from the tool and oriented relative to the tool such that a majority of the cooling agent travels in a vertical direction away from the pin upon exiting a tip end of the nozzle and thereby cools the middle portion of the shaft portion of the tool.

2. The friction stir welding method according to claim 1, wherein the cooling agent is ejected from the nozzle with a flow velocity of at least 160 m/second.

3. The friction stir welding method according to claim 1, wherein a vertical axis line of the tool is directed in a vertical direction, and a first axis line of the cooling nozzle is inclined to eject the cooling agent in an upper direction, away from the pin, by 5° through 35° relative to a horizontal face that is orthogonal to the vertical axis line of the tool.

4. The friction stir welding method according to claim 1, wherein a cross sectional shape of an ejection port at a tip end of the cooling nozzle is long in an up and down direction and short in a transverse direction.

5. The friction stir welding method according to claim 1, wherein a center axis line of an ejecting direction of the cooling nozzle directs upward from a horizontal face.

\* \* \* \* \*